United States Patent
Frerking et al.

(10) Patent No.: US 7,715,853 B1
(45) Date of Patent: May 11, 2010

(54) TERRESTRIAL REPEATER SYSTEM FOR USE WITH CRAFT-MOUNTED BASE STATIONS

(75) Inventors: Melvin D. Frerking, Norcross, GA (US); George O. Hirvela, Carrollton, GA (US); David G. Shively, Smyrna, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 873 days.

(21) Appl. No.: 11/204,337

(22) Filed: Aug. 15, 2005

Related U.S. Application Data (60) Provisional application No. 60/667,807, filed on Apr. 1, 2005.

(51) Int. Cl.
*H04M 1/00* (2006.01)

(52) U.S. Cl. .................. 455/456.4; 455/11.1; 455/12.1; 455/13.1; 455/15; 455/17; 370/315; 370/316; 370/319; 370/320; 370/321

(58) Field of Classification Search ...................... 455/7, 455/11.1, 12.1, 13.1, 15, 17; 370/315, 316, 370/319–323
See application file for complete search history.

(56) References Cited

U.S. PATENT DOCUMENTS

| | | | |
|---|---|---|---|
| 4,623,883 A * | 11/1986 | Konen | 340/825.01 |
| 6,408,180 B1 * | 6/2002 | McKenna et al. | 455/431 |
| 6,650,898 B2 | 11/2003 | Jochim et al. | |
| 6,725,035 B2 | 4/2004 | Jochim et al. | |
| 6,990,338 B2 | 1/2006 | Miller et al. | |
| 2002/0045461 A1 * | 4/2002 | Bongfeldt | 455/522 |
| 2002/0197990 A1 | 12/2002 | Jochim et al. | |
| 2003/0008652 A1 | 1/2003 | Jochim et al. | |
| 2003/0203734 A1 * | 10/2003 | Igloi et al. | 455/431 |
| 2004/0142658 A1 * | 7/2004 | McKenna et al. | 455/11.1 |
| 2006/0205344 A1 * | 9/2006 | Roper et al. | 455/11.1 |
| 2007/0129085 A1 * | 6/2007 | Kennedy, Jr. | 455/456.2 |
| 2007/0202802 A1 * | 8/2007 | Kallio et al. | 455/11.1 |
| 2008/0090567 A1 * | 4/2008 | Gilbert | 455/431 |

* cited by examiner

*Primary Examiner*—Edward Urban
*Assistant Examiner*—Fayyaz Alam (57) ABSTRACT

A craft-mounted repeater system processes signal properties (e.g., signal strength) between terrestrial (ground-based) wireless networks and mobile users that are aboard crafts (e.g., airplanes and/or ships) equipped to allow the user's mobile communications device to communicate at departure and at arrival of the craft. An onboard craft-mounted non-translating in-band only repeater system is a provided that increases the terrestrial mobile network signal levels inside the aircraft or ship to allow passengers to communicate with a terrestrial cellular communications system.

36 Claims, 9 Drawing Sheets

TERRESTRIAL REPEATER SYSTEM FOR USE WITH CRAFT-MOUNTED BASE STATIONS

CROSS-REFERENCE TO RELATED APPLICATIONS

This application claims the benefit of U.S. Provisional Patent application Ser. No. 60/667,807 entitled "TERRESTRIAL REPEATER SYSTEM FOR USE WITH CRAFT-MOUNTED BASE STATIONS" and filed Apr. 1, 2005, the entirety of which is incorporated by reference herein.

TECHNICAL FIELD

This invention is related to communications repeater systems, and more specifically, to repeaters used in human/cargo transportation systems.

BACKGROUND OF THE INVENTION

There are tremendous advances being made to equip transportation systems (e.g., airplanes and ships) with base stations such that mobile cellular users can continue to communicate using wireless communications devices. Typically these craft-mounted base stations form picocells that utilize satellite or other wireless backhaul networks as communication links with terrestrial networks to complete the voice and/or data call. In the case of aircraft, these picocells can be switched on once the aircraft has reached a safe cruising altitude, and turned off when the aircraft is on final landing approach or at other designated times.

A main concern with these craft-mounted base stations is the potential for interference with terrestrial mobile networks and other licensed spectrum bands while in-flight. Although the use of cell phones while airborne is currently prohibited, that may be changing. Government oversight agencies such as the FCC (Federal Communications Commission) and FAA (Federal Aviation Administration) are currently considering allowing the capability of operating cell phones while the aircraft is airborne. Additionally, airlines and the aircraft manufactures are considering increasing the capability of aircraft to be electromagnetically shielded to/from other terrestrial wireless networks. Shielding of the aircraft would in principle reduce (or attenuate) signal levels originating from inside the aircraft, such as from mobile cellular telephones, and thus potentially reduce the level of interference to the terrestrial wireless networks.

Herein is a problem with such craft-mounted systems for the terrestrial wireless operator. It is fairly common today for many wireless customers to desire to use cell phones onboard aircraft, for example, to make last minute calls prior to being told to discontinue the use of all electronic devices. These calls can be extremely important to the terrestrial wireless operators. As the aircraft or ship, for example, is parked at the terminal or dock, and prior to commencing travel, mobile users should not be prohibited from utilizing the terrestrial mobile networks.

If the aircraft or ship is equipped with the additional shielding, the mobile device of the user can have difficulty establishing and maintaining a call with the terrestrial base station that serves the airport or shipping dock due to the additional signal attenuation presented by the aircraft/ship shielding mechanism. Compounding the problem is the difficulty, if not outright prohibition, in zoning additional towers around airports and docks to address the needs of such implementations.

Thus, there is a substantial unmet need in the art for an improved craft-mounted system for mobile communications.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The subject invention is a communications system that processes signal properties (e.g., signal strength) between terrestrial (ground-based) wireless networks and mobile users that are aboard crafts (e.g., airplanes and/or ships) equipped to allow the user's mobile communications device to communicate at departure and at arrival of the craft. An onboard craft-mounted repeater system is a provided that increases the terrestrial mobile network signal levels inside the aircraft or ship to allow passengers to use a terrestrial mobile network prior to or at the end of the craft's travels. Such equipment can include a general base station, Node B base stations, and/or wireless access points, such as is associated with the operation of picocells or microcells.

To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

DETAILED DESCRIPTION OF THE INVENTION

The invention is now described with reference to the drawings, wherein like reference numerals are used to refer to like elements throughout. In the following description, for purposes of explanation, numerous specific details are set forth in order to provide a thorough understanding of the subject invention. It may be evident, however, that the invention can be practiced without these specific details. In other instances, well-known structures and devices are shown in block diagram form in order to facilitate describing the invention.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 1:
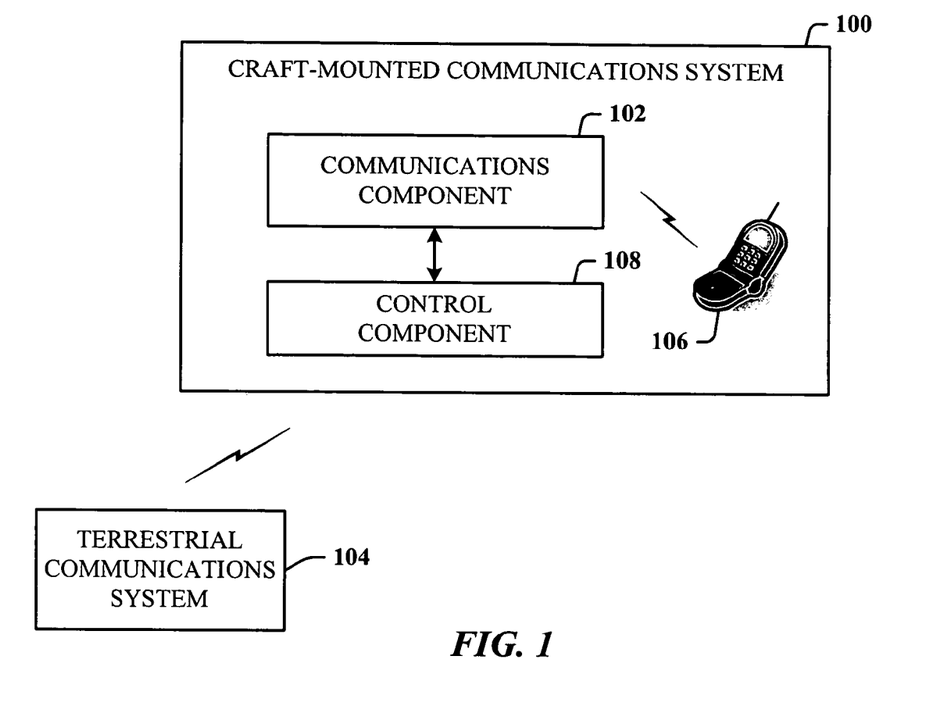
FIG. 1 illustrates a craft-mounted system in accordance with the subject invention.

Referring initially to the drawings, FIG. 1 illustrates a craft-mounted system 100 in accordance with the subject invention. The system 100 can include a communications component 102 that facilitates communications between the craft-mounted system 100 of a craft (not shown) and a terrestrial communications system 104. The communications between the communications component 102 and the terrestrial system 104 can include non-translated signals processed from signals received from a mobile terminal 106 of the craft. Such non-translated signals can be communicated at least while the craft is in arrival mode and departure mode.

A control component 108 is provided that can include a craft control system such that craft control signals can be processed by the control component 108 to further control the communications component. For example, in one implementation, the control component 108 facilitates automatic and/or manual shutdown of portions or all of the communications component 102 that provides communications between the craft-mounted system 100 and the terrestrial system 104 based on data and/or signals received by the control component 108 from other craft systems. In another example, the control component 108 facilitates automatic and/or manual enablement of portions or all of the communications component 102 that provides communications between the craft-mounted system 100 and the terrestrial system 104 based on data and/or signals received by the control component 108 from other craft systems.

It is within contemplation of the disclosed innovation that the control component 108 can also monitor data and/or signals of the communications component 102 and react accordingly based on the data and/or signals received therefrom. For example, certain channels can be managed such that one channel is enabled for communications while another channel is disabled. These are only but a few examples of the aspects that can be monitored and controlled.

Figure 2:
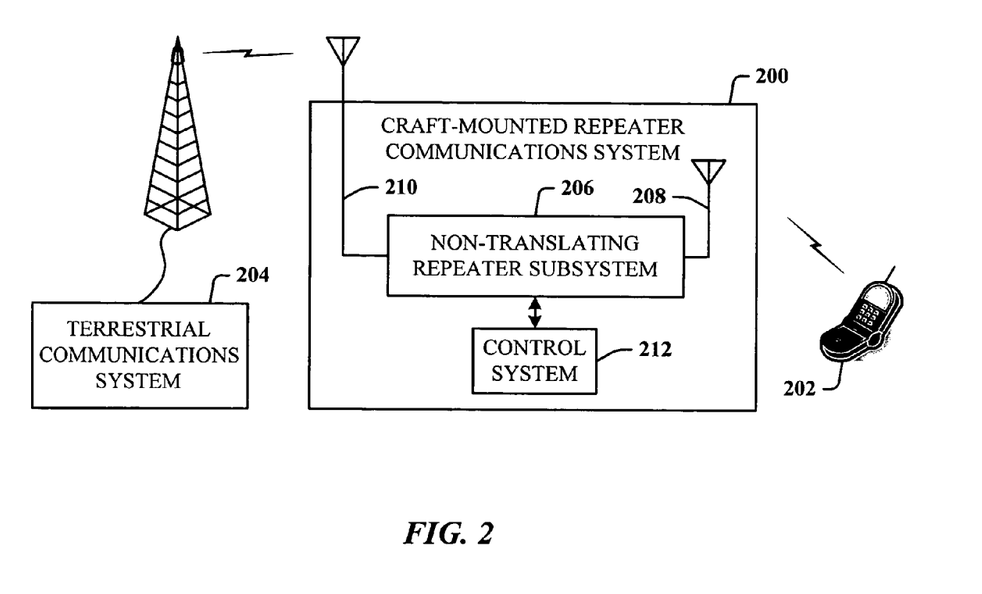
FIG. 2 illustrates a more detailed craft-mounted repeater system in accordance with the subject invention.

FIG. 2 illustrates a craft-mounted repeater system 200 in accordance with the subject invention. The system 200 is mounted in a craft (e.g., an airplane and ship) such that communications can occur between a user of a mobile terminal 202 (and other portable devices that can provide mobile communications) in the craft and a terrestrial mobile communications system 204. The onboard craft-mounted terrestrial repeater system 200 increases terrestrial mobile network signal levels inside the craft (e.g., aircraft or ship) to facilitate communications over the terrestrial communications system 204 by mobile users prior to departure and/or at arrival of the craft.

The system 200 includes a repeater subsystem 206 that facilitates the wireless interface via a first antenna 208 (an internal antenna located inside the craft) between one or more of the mobile terminals 202 and the terrestrial communications system 204. The repeater subsystem 206 can also include a second antenna 210 that provides external wireless access to the terrestrial communications system 204. In a wireless communications system, a repeater generally consists of a radio receiver, an amplifier, a transmitter, an isolator, and two antennas. In a translating repeater system, the transmitter produces a signal on a frequency that differs from the received signal. This can be necessary to prevent the strong transmitted signal from disabling the receiver. The isolator provides additional protection in this respect.

The repeater subsystem 206 of the subject invention is a non-translating, in-band only, repeater that retransmits signals without changing their frequencies. The repeater subsystem 206 supports wireless networks such as cellular, PCS (Personal Communications Service), Wi-Fi, WiMax, AWS (Advance Wireless Services), 700 MHz and WCS (Wireless Communications Service), for example. Moreover, devices operating according to communications technologies such as CDMA (Code Division Multiple Access) (e.g., 800/1900 bands), TDMA (Time Division Multiple Access), GSM (Global System for Mobile Communications) (e.g., 850/1900 bands), and UMTS (Universal Mobile Telecommunications System) can operate in accordance with the subject invention.

The onboard system 200 can also include a control system 212 (also referred to as the repeater control system) that monitors and controls aspects of thereof. For example, the control system 212 can enable/disable the repeater subsystem 206 in accordance with predetermined instructions and/or external signals that are received. For example, the control system 212 can be configured to interface to a craft control system (not shown) such that signals and data that are communicated thereby can be utilized as triggers that are further used to control the onboard system 200. This is described in greater detail infra. Additionally, the control system 212 can be used to record data, signals, and other information related to the onboard system 200.

Figure 3:
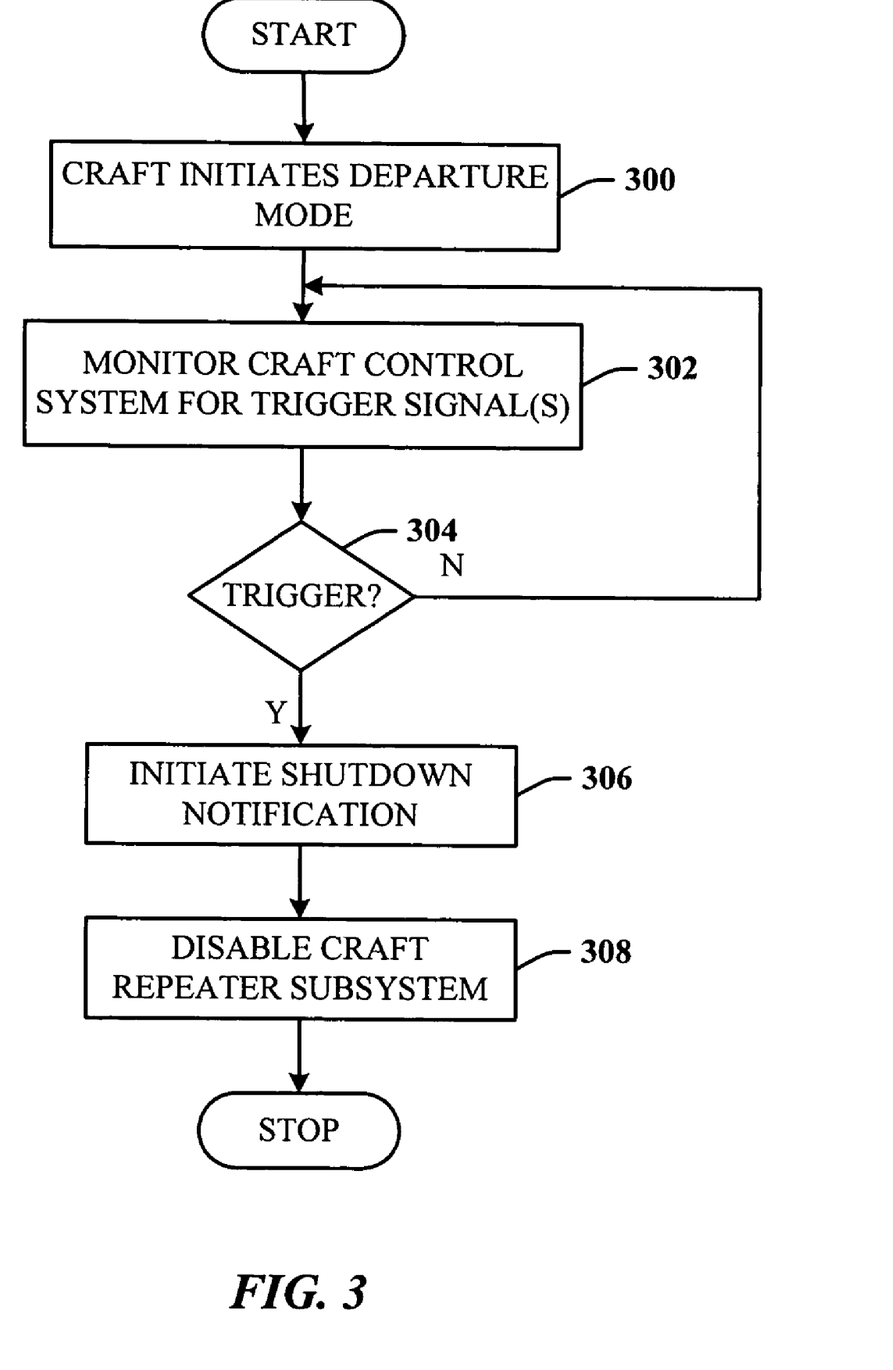
FIG. 3 illustrates a methodology of controlling onboard repeater system of the invention in accordance with a departure mode.

FIG. 3 illustrates a methodology of controlling onboard repeater system of the invention in accordance with a departure mode. While, for purposes of simplicity of explanation, the one or more methodologies shown herein, e.g., in the form of a flow chart, are shown and described as a series of acts, it is to be understood and appreciated that the subject invention is not limited by the order of acts, as some acts may, in accordance with the invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the invention.

At 300, the craft initiates departure mode. If an aircraft, this mode can include parked at the gate such that travelers on the plane can communicate using their cell phones (and other similarly capable devices) to communicate over the terrestrial communications system. Departure mode can also include the time up to and including liftoff, at which time cellular communications (and other personal communications devices) are required to be turned off. It is to be appreciated that in another implementation, departure mode can include a short period of time (e.g., in the regime of seconds or minutes) after the aircraft has lifted off the runway.

However, FAA/FCC regulations require that such devices no longer be operated during certain times (or blackout periods). Thus, the onboard system of the subject invention can be disabled at or about these times to prevent communications between onboard travelers and terrestrial callers. To this end, data and signals associated with events such as movement (e.g., taxiing), speed, altitude, and liftoff (e.g., landing gear up control) can be utilized to trigger the repeater control system to enable or disable the repeater system. Accordingly, at 302, the repeater control system interfaces to the aircraft control system to monitor and receive one or more signals and/or data that will then be processed to function as a trigger for enabling/disabling the repeater subsystem during required blackout periods. At 304, if a trigger is not detected, flow is back to 302 to continue monitoring the aircraft control system (s) for data and/or signals that can be used as trigger signals.

At 304, if a trigger is detected, flow is to 306, where in one implementation, an optional notification message is sent indicating that the repeater subsystem is shutting down. At 308, the repeater subsystem is then shutdown (or is disabled in some form) to prevent mobile communications between the onboard mobile terminals and the terrestrial communications system.

Figure 4:
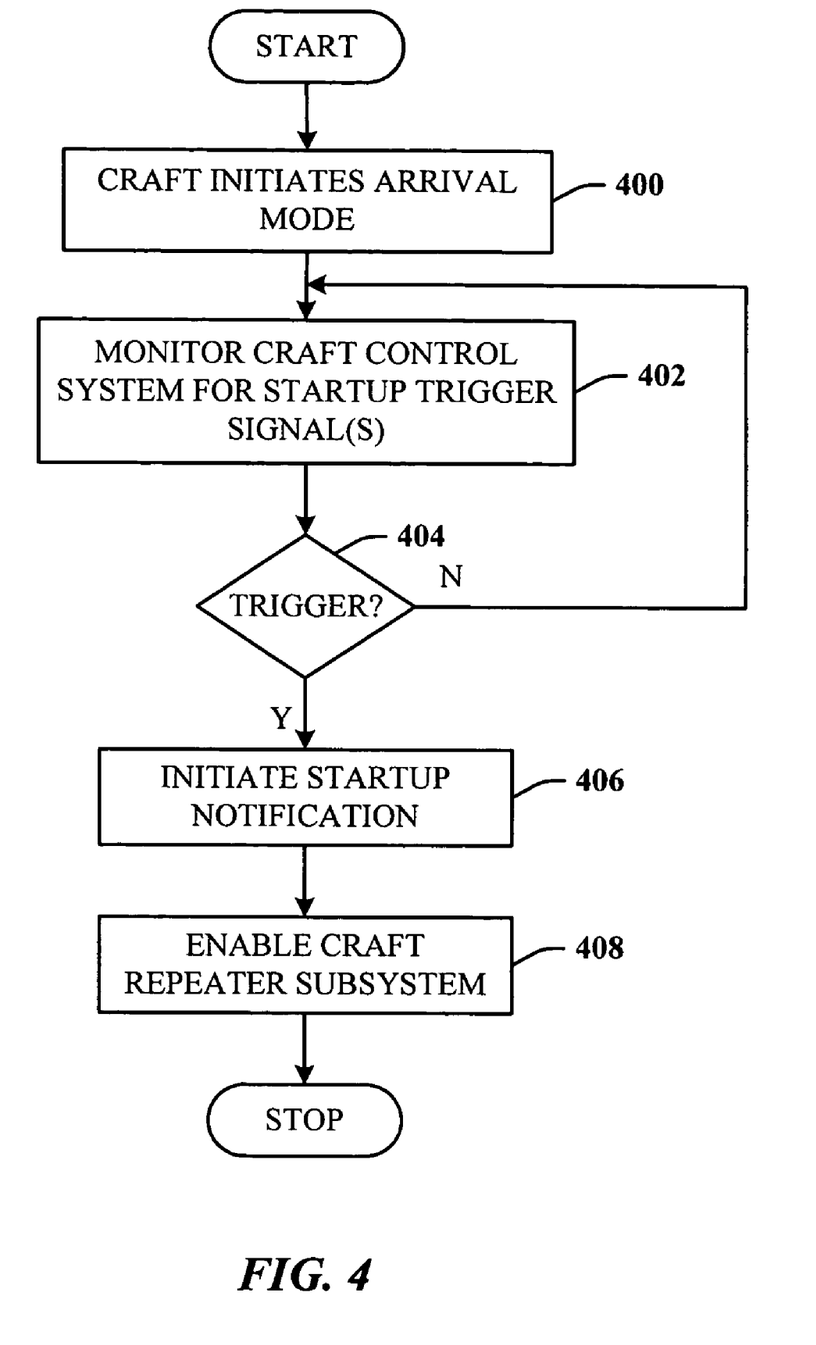
FIG. 4 illustrates a methodology of controlling onboard repeater system of the invention in accordance with an arrival mode.

FIG. 4 illustrates a methodology of controlling onboard repeater system of the invention in accordance with an arrival mode. At 400, the craft initiates arrival mode. If the craft is an airplane, this includes dropping below a predetermined altitude (e.g., 10,000 feet) and considering an event such as the landing approach such that travelers on the plane can no longer communicate using their cell phones (and other similarly capable devices) to communicate over the terrestrial communications system. Arrival mode can include the time shortly after landing on the runway to the time that the aircraft is parked at the gate, at which time cellular communications (and other personal communications devices) can be turned on and used. It is to be appreciated that in another implementation, arrival mode can include a short period of time (e.g., in the regime of seconds or minutes) before the aircraft touches down on the runway.

In any case, whenever allowed, the onboard repeater subsystem can then be enabled such that passengers can use mobile phones, for example, to communicate over terrestrial communications system. In that data and signals can exist that are related to landing events such as speed, altitude, and landing (e.g., landing gear down control), such information can be utilized as trigger signals to the repeater control system of the invention to enable the repeater subsystem. Accordingly, at 402, the repeater control system interfaces to the aircraft control system to monitor and receive one or more signals and/or data that will then be processed to function as triggers for enabling the repeater subsystem after the required blackout period. At 404, if a trigger is not detected, flow is back to 402 to continue monitoring the aircraft control system (s) for data and/or signals that can be used as trigger signals.

At 404, if a trigger is detected, flow is to 406, where in one implementation, an optional notification message is sent indicating that the repeater subsystem is about to be enabled. At 408, the repeater subsystem is then enabled for operation to provide mobile communications between the onboard mobile terminals and the terrestrial communications system.

Figure 5:
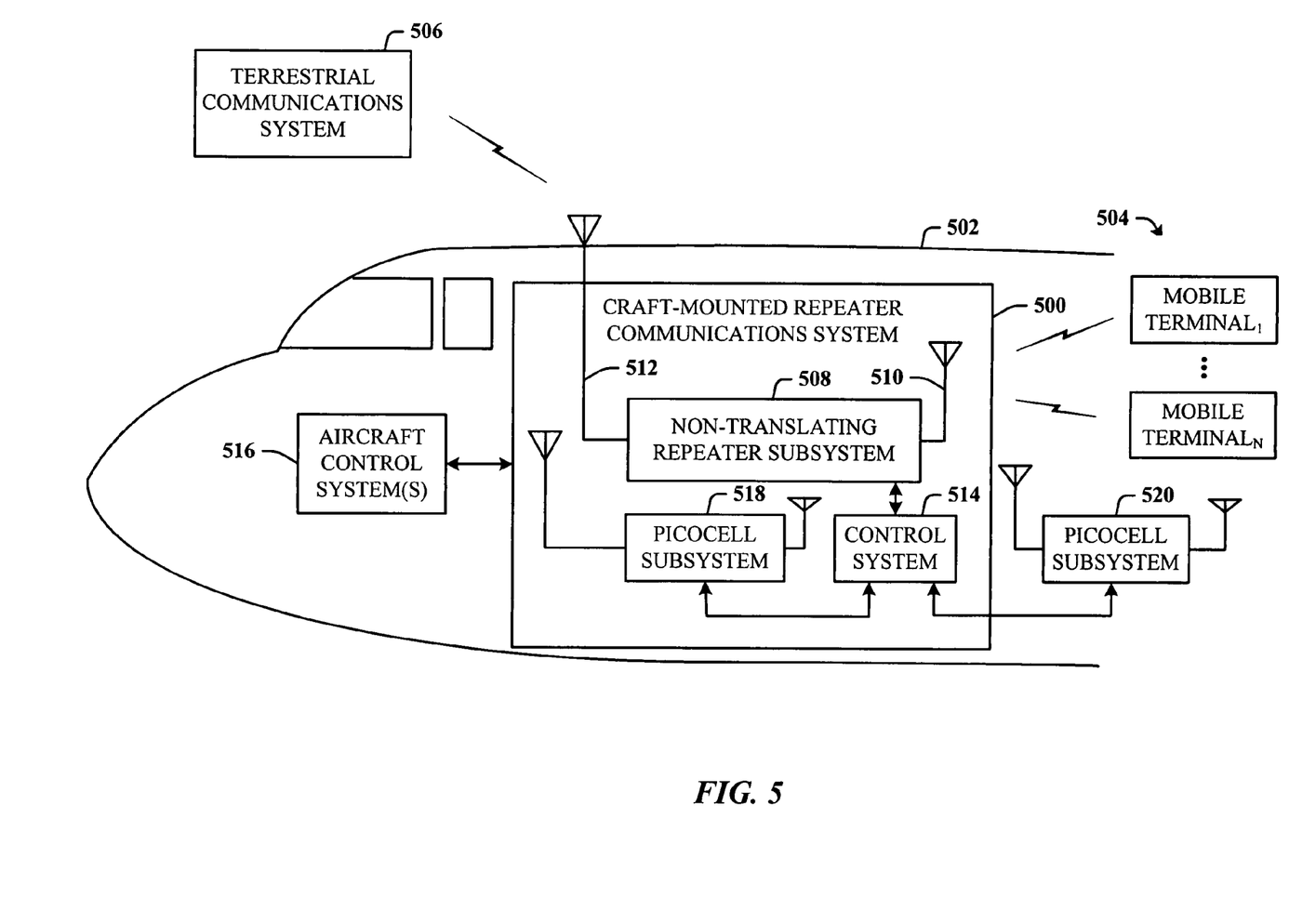
FIG. 5 illustrates implementation of an aircraft system in accordance with the invention.

FIG. 5 illustrates implementation of a repeater communications system 500 in an aircraft 502 in accordance with the invention. Here, the repeater system 500 facilitates mobile communications between passengers using mobile terminals 504 (denoted MOBILE TERMINAL$_1$, . . . , MOBILE TERMINAL$_N$) and a terrestrial communications cellular system 506. The repeater system 500 includes a non-translating repeater subsystem 508 that includes at least the capabilities described hereinabove with respect to subsystem 206. An internal antenna 510 of the repeater system 500 facilitates the communication of signals between the terminals 504 and the onboard repeater system 500. A second (or external) antenna 512 of the repeater communications system 500, portions of which exit the skin or outer structure of the aircraft 502, facilitates communications between the onboard repeater system 500 and the terrestrial cellular communications system 506.

A repeater control system 514 of the system 500 can provide monitor and control capabilities in conjunction with the repeater subsystem 508, and can further interface to an aircraft control system 516 (or a plurality of the aircraft control systems) to communicate signals and/or data that can be processed as one or more trigger signals for managing (e.g., enable/disable) the repeater subsystem 508.

In one implementation, the repeater control system 514 communicates with a picocell subsystem 518 (or base station) that is internal to the repeater system 500, and provides onboard communications for the mobile users. In an alternative implementation, a picocell subsystem 520 (or base station) provides the same or similar function as the internal picocell subsystem 518, but is external to the onboard repeater system 500. In yet another implementation, both the internal and external picocell subsystems (518 and 520) are provided in support of mobile communications of the aircraft 502.

Figure 6:
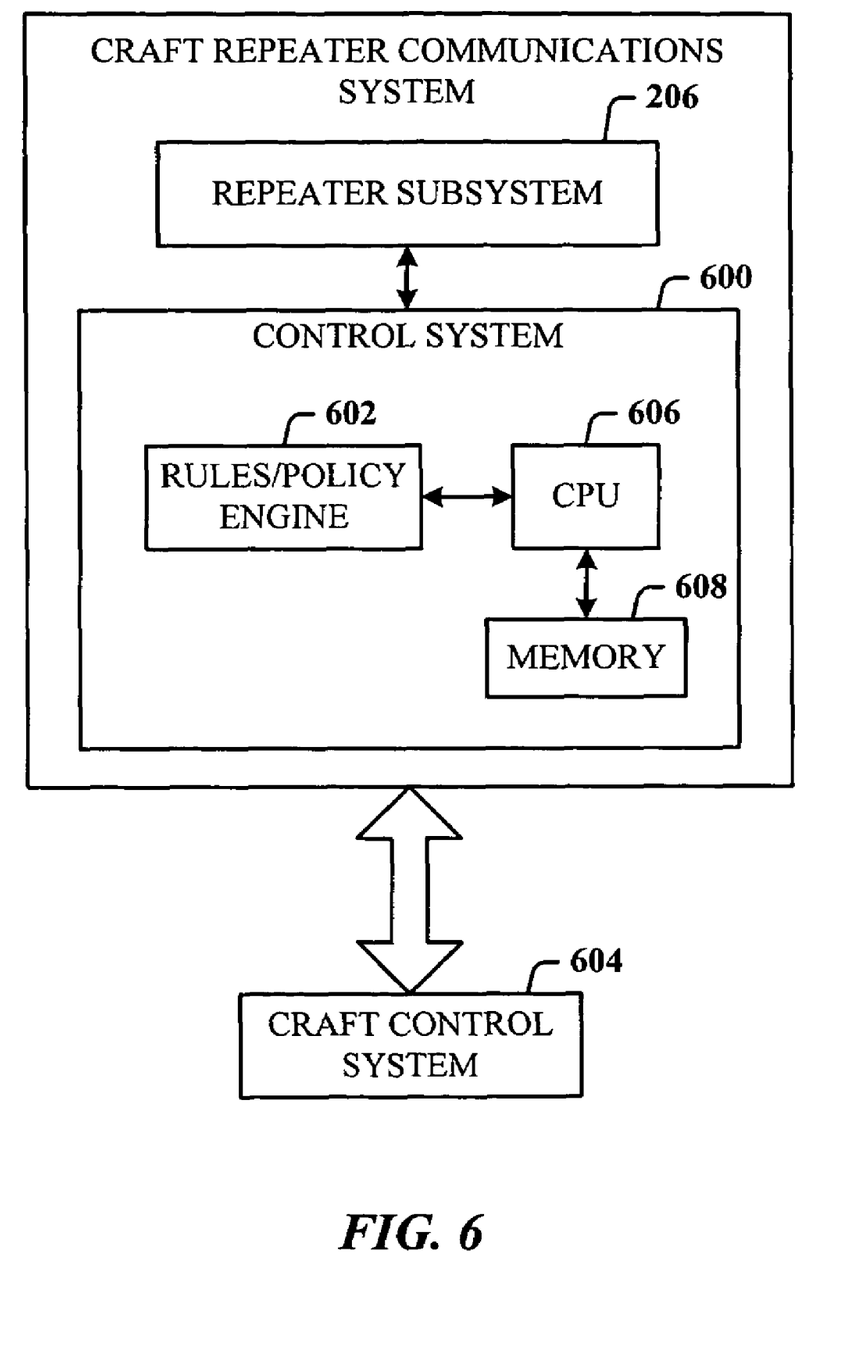
FIG. 6 illustrates an implementation of a repeater control system in accordance with the invention.

FIG. 6 illustrates an implementation of a repeater control system 600 in accordance with the invention. The control system 600 can include a rules (or policy) engine 602 that processes predetermined rules (or policies) based on the signals and/or data received from a craft control system 604. A rule can be the logical operations of several signal and/or data parameters. One simple example is IF (landing gear is down), THEN (enable) onboard repeater subsystem. A more complex rule can be, IF (landing gear is down) AND (the speed is less than 100 miles per hour), THEN (enable) onboard repeater subsystem). Yet another rule can be IF (landing gear is down) AND (the speed is less than 100 miles per hour) AND (GPS-Global Positioning System coordinates indicate a European country), THEN (disable) onboard repeater subsystem. It is to be appreciated that the number and complexity of rules and policies that can be utilized are numerous.

In another implementation, the engine 602 processes the rules (or policies) based on passenger usage of the repeater subsystem 206 (similar to subsystem 508). For example, IF (the number of channels is exceeded), THEN (insert passenger registration in queue for next available channel). In support of the engine operations, the repeater control system 600 can also include a processor 606 (denoted CPU) that monitors and controls all operations of the system 600, as well as all or certain functions of the repeater subsystem 206. A memory 608 facilitates the storage (and/or caching) of data and applications that support operation of the repeater control system 600.

It is to be appreciated that the control system 600 can be fabricated as an ASIC (Application Specific Integrated Circuit) or FPGA (Field Programmable Gate Array) system such that all programs and algorithms are programmed thereinto for more rugged and reduced form factor applications. Additionally, communications between the repeater control system 600 and the craft control system can be via any conventional wired (and optical)/wireless communications architectures.

Figure 7:
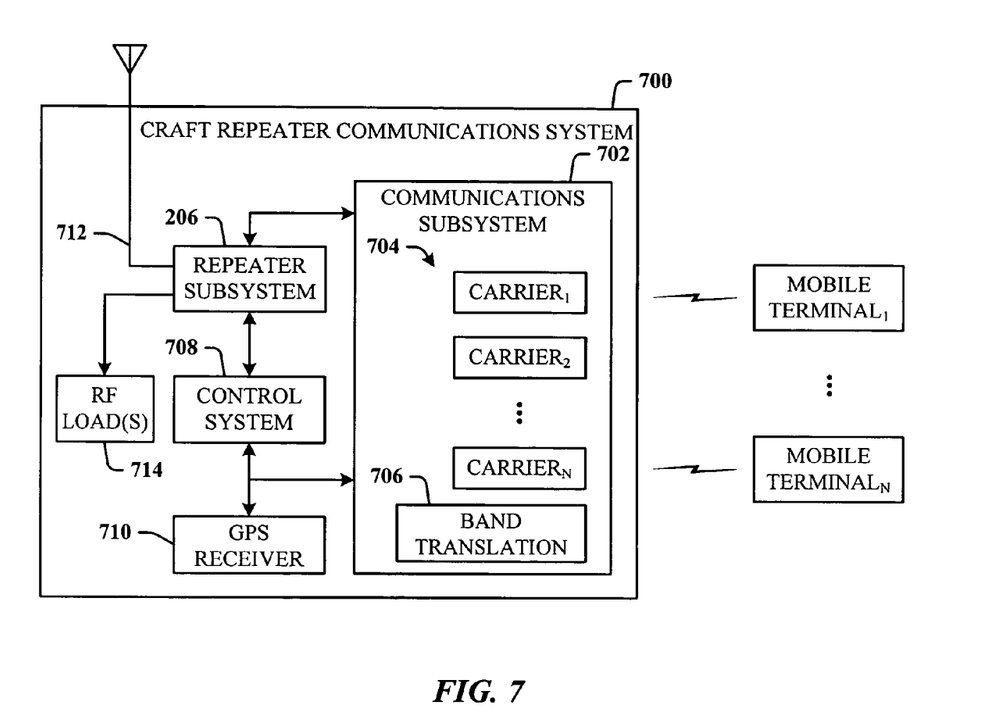
FIG. 7 illustrates an implementation of a craft-mounted repeater system in accordance with the invention.

FIG. 7 illustrates an implementation of a craft-mounted repeater system 700 in accordance with the invention. In this particular implementation, the onboard repeater system 700 is capable of accommodating different carrier types of major cellular carriers, for example. In support thereof, the onboard system 700 includes a communications subsystem 702 that can process a plurality of different carriers 704 (denoted $CARRIER_1, CARRIER_2, \ldots, CARRIER_N$), which could be associated with Cingular, Verizon, and Sprint, to name a few. Thus, passengers whose mobile terminals (denoted $MOBILE\ TERMINAL_1, \ldots, MOBILE\ TERMINAL_N$) communicate over a different carrier can still benefit from the architecture of the disclosed invention. Additionally, the communications subsystem 702 can include a band translation component 706 that facilitates frequency band translation.

The onboard system 700 can also include the repeater subsystem 206 (similar to subsystem 508) for non-translation in-band only signal repeating. In this implementation, the onboard system 700 can also include a GPS receiver 710 such that the geographic location information of the system 700 can be ascertained. The GPS receiver includes an antenna (not shown) that also has external access to the craft such that GPS signals can be received. This information can be useful at least for the rules engine described supra. A repeater control system 708 provides monitor and control of the repeater system components (206, 702, 704, 706, and 710), and can also interface to the craft control system (not shown) to receive data and/or signals therefrom for at least trigger processing for managing the repeater subsystem 206.

The craft-mounted repeater system 700 can include additional functionality to ensure that it does not facilitate potential interference. If the craft-mounted repeater subsystem 206 is turned off, terrestrial signals could propagate through an external antenna 712 into the system as conducted or radiated emissions. For radiated emissions, the system can include dummy RF (Radio Frequency) load(s) 714 in the RF chain inside the craft (e.g., aircraft cabin) that switches the desired RF signals from the antenna/distributed antennas (leaky cable) to the dummy RF load(s) 714. When the system 700 is on, it switches to the internal antenna/distributed antennas (leaky cable). For conducted emissions, standard EMC (Electromagnetic Compatibility) preventive measures such as coupling capacitors and/or ferrites can be employed on the cable paths from the outside antenna as it progresses through the shielding.

Figure 8:
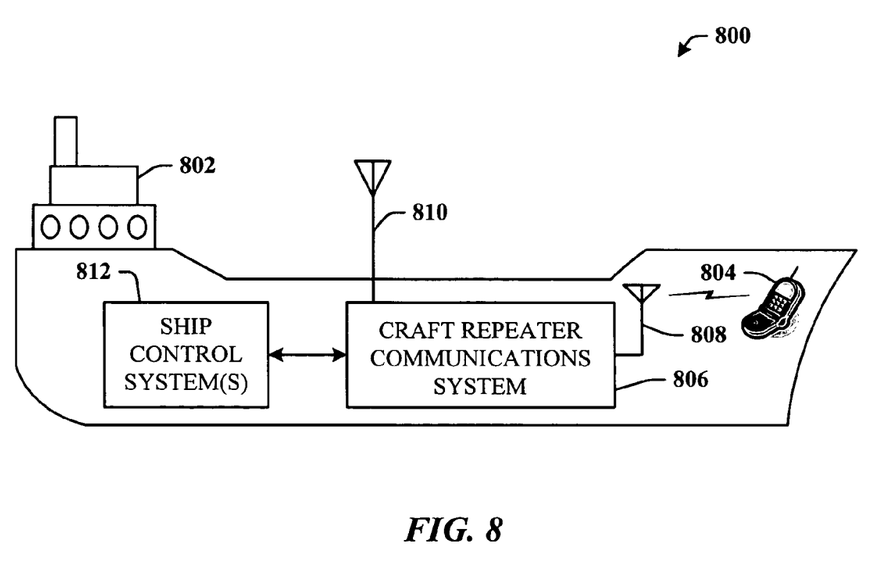
FIG. 8 illustrates an implementation of a ship-mounted repeater system in accordance with the invention.

FIG. 8 illustrates an implementation of a ship-mounted repeater system 700 in accordance with the invention. Here, a ship 802 can be at port. A user of a mobile terminal 804 can communicate with a craft-mounted repeater system 806 via an internal antenna 808. The onboard repeater system 806 also a second antenna 810 that facilitates mobile communications with a terrestrial cellular communications network (not shown). Additionally, the ship-mounted repeater system 806 can communicate with a ship-mounted control system 812 such that data and/or signals of the ship can be used to enable/disable the onboard repeater system 806, where desired.

In summary, the craft-mounted terrestrial repeater system is a non-translating, in-band only, repeater system for wireless networks such as cellular, PCS, Wi-Fi, WiMax, AWS, 700 MHz and WCS. The craft repeater includes antennas to distribute signals from within and outside the craft. A duplex antenna system can be part of the craft repeater system. One antenna is mounted beyond the craft shielding, preferably on the outside of the craft. Signals are received by the external antenna and/or amplified, and brought through the craft shielding (or hull) by means of a cable and reradiated inside the cabin of the aircraft by means of another antenna mounted inside the aircraft or by a distributed antenna systems such as a leaky cable.

Additionally, the craft-mounted repeater system includes associated electronics with a controller and interface to operate in conjunction with a craft-mounted base station. The controller serves to manage functionality (e.g., turn on/off) of the craft-mounted repeater system and turn off/on the craft-mounted base station at defined intervals, such as leaving or arriving at the terminal and in-flight or in travel away from the terrestrial networks. Additionally, other electronics onboard the aircraft, such as GPS, air speed indicators, altitude signals, and cabin signaling can be used and interfaced with the craft repeater system and base station to ideally configure the defined operations period of the craft repeater and base station.

Figure 9:
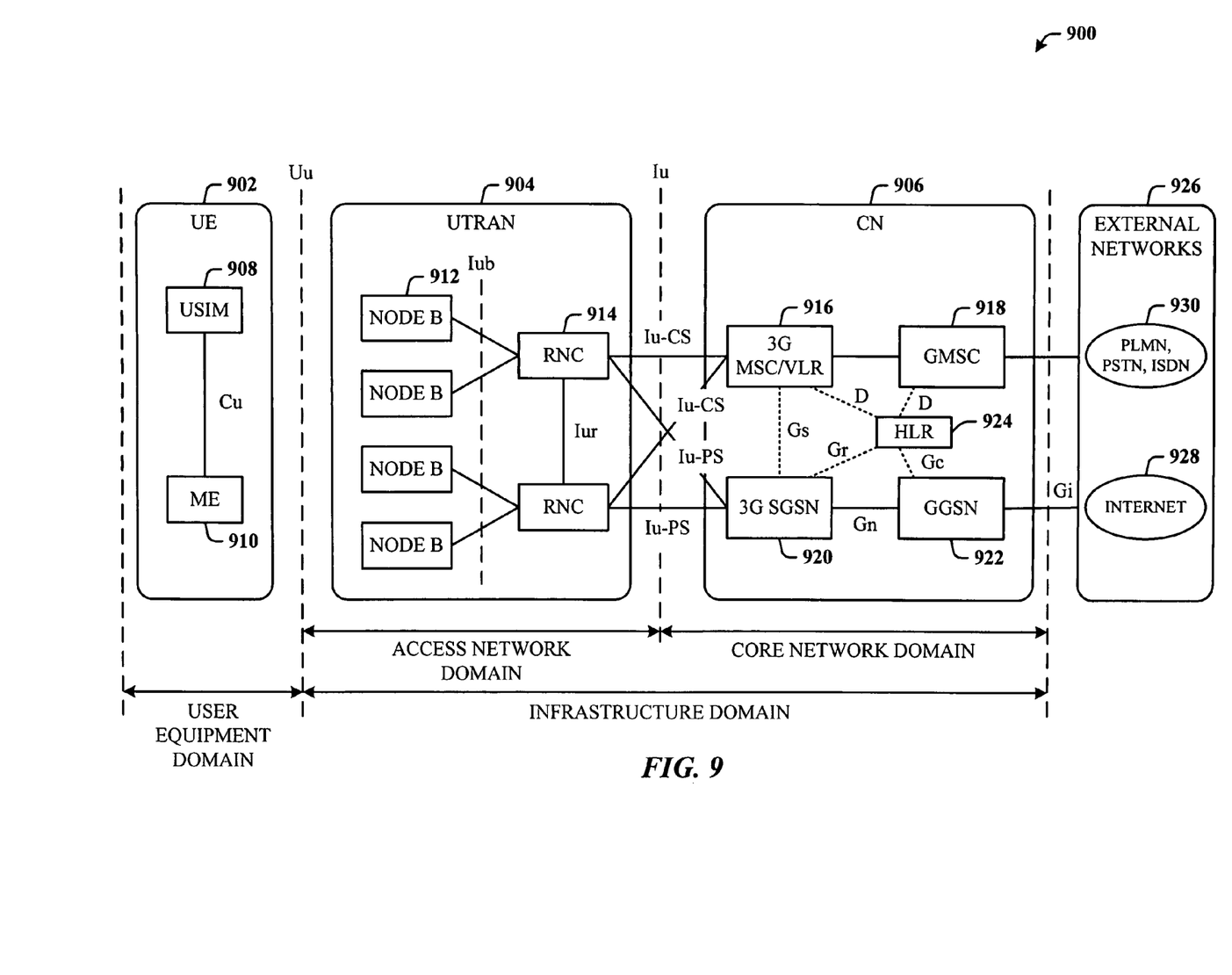
FIG. 9 illustrates an exemplary UMTS network that facilitates terrestrial communications for a craft-based mobile terminal in accordance with the subject innovation.

FIG. 9 illustrates an exemplary UMTS network 900 that facilitates terrestrial communications for a craft-based mobile terminal in accordance with the subject innovation. The architecture is based on the 3GPP (Third Generation Partnership Project) Release 99 specification. However, it is to be understood that the subject innovation can be applied to any UMTS telecommunications architecture, including by way of example, Release 5 (R5) and, R5 and Release 6 (R6) 3GPP standards. UMTS offers teleservices (e.g., speech and/or SMS-Short Message Service) and bearer services, which provide the capability for information transfer between access points. Negotiation and renegotiation of the characteristics of a bearer service can be performed at session or connection establishment, and during an ongoing session or connection. Both connection oriented and connectionless services can be offered for point-to-point and point-to-multipoint communications.

The following frequencies 1885-2025 MHz and 2110-2200 MHz can be allocated for UMTS use. However, the innovative aspects described herein can also be applied to other frequency bands. Bearer services can have different QoS (quality-of-service) parameters for maximum transfer delay, delay variation and bit error rate. Offered data rate targets are: 144 kbps satellite and rural outdoor; 384 kbps urban outdoor; and 2048 kbps indoor and low range outdoor.

UMTS network services can have different QoS classes for four types of traffic: conversational class (e.g., voice, video telephony, video gaming); streaming class (e.g., multimedia, video on demand, webcast); interactive class (e.g., web browsing, network gaming, database access); and background class (e.g., email, SMS, downloading).

UMTS can also support have a virtual home environment, which is a concept for portability across network boundaries and between terminals in a personal service environment. Personal service environment means that users are consistently presented with the same personalized features, user interface customization and services in whatever network or terminal, wherever the user may be located. UMTS also includes network security and location based services.

The UMTS network 900 can consist of three interacting domains; a user equipment (UE) domain 902, a UMTS Terrestrial Radio Access Network (UTRAN) domain 904, and a core network (CN) domain 906. The UTRAN domain 904 is also referred to as the access network domain and the CN 906 is referred to as the core network domain, the both of which comprise an infrastructure domain.

The UE domain 902 includes a USIM (user services identity module) domain and an ME (mobile equipment) domain. User equipment is the equipment used by the user to access UMTS services. In the UE domain 902, the UMTS IC card is the USIM 908 which has the same physical characteristics as GSM SIM (subscriber identity module) card. The USIM interfaces to ME 910 via a Cu reference point. Functions of the USIM include: support of one USIM application (and optionally, more than one); support of one or more user profiles on the USIM; update of USIM specific information over the air; security functions; user authentication; optional inclusion of payment methods; and optional secure downloading of new applications.

UE terminals work as an air interface counter part for Node-B devices of the access network and have many different types of identities. Following are some of the UMTS identity types, which are taken directly from GSM specifications: international mobile subscriber identity (IMSI); temporary mobile subscriber identity (TMSI); packet temporary mobile subscriber identity (P-TMSI); temporary logical link identity (TLLI); mobile station ISDN (MSISDN); international mobile station equipment identity (IMEI); and international mobile station equipment identity and software version number (IMEISV).

A UMTS mobile station (MS) can operate in one of three modes of operation. A PS/CS mode of operation is where the MS is attached to both the PS (packet-switched) domain and CS (circuit-switched) domain, and the MS is capable of simultaneously operating PS services and CS services. A PS mode of operation is where the MS is attached to the PS domain only, and can only operate services of the PS domain. However, this does not prevent CS-like services from being offered over the PS domain (e.g., VoIP). In a third CS mode of operation, the MS is attached to the CS domain only, and can only operate services of the CS domain.

The UTRAN 904 provides the air interface access method for the UE domain 902. The reference point between the UE domain and the infrastructure domain is the Uu UMTS radio interface. The access network domain provides the physical entities that manage resources of the access network and facilitates access to the core network domain. In UMTS terminology, a base station of the access network domain is referred as a Node-B device 912, and control equipment for Node-B devices is called a radio network controller (RNC) 914. The interface between the Node-B device and the RNC 914 is the Iub interface. The interface between two RNCs is called the Iur interface.

The functions of Node-B devices include: air interface transmission/reception; modulation and demodulation; CDMA (Code Division Multiple Access) physical channel coding; micro diversity; error handing; and closed loop power control. The functions of the RNC include: radio resource control; admission control; channel allocation; power control settings; handover control; macro diversity; ciphering; segmentation and reassembly; broadcast signaling; and open loop power control.

Wideband CDMA (WCDMA) technology was selected for UTRAN air interface. UMTS WCDMA is a direct sequence CDMA system where user data is multiplied with quasi-random bits derived from WCDMA spreading codes. In UMTS, in addition to channelization, codes are used for synchronization and scrambling. WCDMA has two basic modes of operation: frequency division duplex (FDD) and time division duplex (TDD).

The Core Network is divided in circuit-switched and packet-switched domains. Some of the circuit-switched elements are a mobile services switching center (MSC) and visitor location register (VLR) 916 and gateway MSC (GMSC) 918. Packet-switched elements include a serving GPRS support node (SGSN) 920 and gateway GPRS support node (GGSN) 922. Some network elements such as an EIR (equipment identity register) (not shown), HLR (home location register) 924, VLR and AuC (authentication center) (not shown) can be shared by both domains.

A function of the CN 902 is to provide switching, routing and transit for user traffic. The CN 902 also contains the databases and network management functions. The basic CN architecture for UMTS is based on the GSM network with GPRS (general packet radio service) capability. All equipment is modified for UMTS operation and services. The radio access network has several interfaces which can be configured and dimensioned. The CN 906 interfaces to the radio access domain via an Iu interface. An Iu-CS (circuit-switched) reference point interfaces an RNC of the access network to the MSC/VLR entity 916 of the CN 906 for voice from/to the MSC/VLR 916. An Iu-PS (packet-switched) reference point interfaces an RNC of the access network to the SGSN entity 920 of the CN 906 for data from/to the SGSN 920.

In the CN 906, a Gs interface is provided between the MSC/VLR 916 and the SGSN. A Gn interface is provided between the SGSN 920 and the GGSN 922. A D interface is provided between the MSC/VLR 916 and the HLR 924, and the HLR 924 and the GMSC 918. A Gr interface is provided between the SGSN 920 and the HLR 924. A Gc interface is provided between the GGSN 922 and the HLR 924.

The CN 906 provides the interface from the UE domain 902 to external networks 926 such as the Internet 928 via a Gi interface from the GGSN 922, and other networks 930 via the GMSC 918, which can include a PLMN (public land mobile network), PSTN (public switched telephone network) and ISDN (integrated service digital network) networks.

Asynchronous Transfer Mode (ATM) is defined for UMTS core transmission. ATM Adaptation Layer type 2 (AAL2) handles circuit-switched connection, and packet connection protocol AAL5 is designed for data delivery.

The architecture of the CN 906 can change when new services and features are introduced. Number Portability Database (NPDB), for example, can be used to enable a user to change the network while keeping their old phone number. A gateway location register (GLR) can be employed to optimize the subscriber handling between network boundaries. Additionally, the MSC/VLR and SGSN can merge to become a UMTS MSC.

Summarizing the UMTS frequencies, 1920-1980 MHz and 2110-2170 MHz can be employed for FDD and WCDMA. Paired uplink and downlink channel spacing can be 5 MHz and raster is 200 kHz. An operator can use 3-4 channels (2×15 MHz or 2×20 MHz) to build a high-speed, high-capacity network. Frequencies 1900-1920 MHz and 2010-2025 MHz can be employed for TDD and TD/CDMA. Unpaired channel spacing can be 5 MHz and raster is 200 kHz. Transmit and receive are not separated in frequency. Frequencies 1980-2010 MHz and 2170-2200 MHz can be employed for satellite uplink and downlink.

What has been described above includes examples of the invention. It is, of course, not possible to describe every conceivable combination of components or methodologies for purposes of describing the subject invention, but one of ordinary skill in the art may recognize that many further combinations and permutations of the invention are possible. Accordingly, the invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates mobile communications on a craft, comprising:

a communications component that facilitates communication of non-translated signals between a mobile terminal of a user aboard the craft and a terrestrial communications system, the communications component receives signals from the mobile terminal and facilitates non-translated communication of the signals between the mobile terminal and the terrestrial communications system while the craft is in at least one of an arrival mode or departure mode; and a control component that at least one of enables or disables the communications component in response to the craft being in at least one of arrival mode or departure mode, the control component at least one of transmits a startup notification message when communications are being enabled or transmits a shutdown notification message when communications are being disabled.

2. The system of claim 1, wherein the craft is an airplane and the non-translated signals carry voice communications during the arrival mode and the departure mode.

3. The system of claim 1, the control component interfaces to a craft control system and processes one or more craft control signals associated with the craft control system, the control component controls the communications component as a function of the one or more craft control signals.

4. The system of claim 1, wherein the departure mode includes at least one of before or within a predetermined time span of liftoff.

5. The system of claim 1, wherein the arrival mode includes at least one of within a predetermined time span of touchdown or thereafter.

6. A ship that employs the system of claim 1.

7. The system of claim 1, wherein the communications component is controlled based upon a GPS (Global Positioning System) signal.

8. The system of claim 1, wherein the communications component is controlled based upon one or more trigger signals received from a control system of the craft.

9. The system of claim 1, wherein the communications component comprises a repeater that communicates the non-translated signals, the non-translated signals are voice signals.

10. The system of claim 1, wherein the communications component operates in-band.

11. The system of claim 1, wherein the communications component facilitates communications with a wireless network that comprises at least one of cellular, PCS (Personal Communications Service), Wi-Fi, WiMax, AWS (Advance Wireless Services), 700 MHz, or WCS (Wireless Communications Service).

12. A system that facilitates mobile communications on an aircraft, comprising:

a communications component that facilitates communication of non-translated voice signals between a mobile terminal of a user aboard the aircraft and a terrestrial communications system while the aircraft is in at least one of an arrival mode or departure mode, the communications component is in direct communication with the terrestrial communications system; and a control component that interfaces to an aircraft control system and processes one or more aircraft control signals associated with the aircraft control system, the control component at least one of enables or disables the communications component based on the one or more aircraft control signals, and wherein the control component at least one of transmits a startup notification message when the communications component is being enabled or transmits a shutdown notification message when the communications component is being disabled.

13. The system of claim 12, wherein the communications component includes a repeater that directly communicates the non-translated voice signals.

14. The system of claim 12, wherein the communications component accommodates at least one of GSM, CDMA, UMTS, or TDMA communications.

15. The system of claim 12, wherein the communications component facilitates in-band only communication of the non-translated voice signals.

16. A system that facilitates mobile communications on a craft, comprising:

a craft-mounted non-translating repeater subsystem that facilitates in-band communication of non-translated voice signals between a mobile terminal of a user aboard the craft and a terrestrial communications system, the craft-mounted non-translating repeater subsystem increases signal levels of the terrestrial communications system inside the craft and facilitates the in-band communication of non-translated voice signals between the mobile terminal and the terrestrial communications system while the craft is in at least one of an arrival mode or departure mode; and a control system that interfaces to a craft control system and processes one or more craft control signals associated with the craft control system, the control system at least one of enables or disables the craft-mounted non-translating repeater subsystem while the craft is in at least one of the arrival mode or departure mode, and wherein the control system at least one of transmits a startup notification message when the craft-mounted non-translating repeater subsystem is being enabled or transmits a shutdown notification message when the craft-mounted non-translating repeater subsystem is being disabled.

17. The system of claim 16, further comprising a picocell subsystem that facilitates craft communications between the craft-mounted repeater subsystem and the mobile terminal.

18. The system of claim 16, further comprising an antenna that breaches an outer surface of the craft and facilitates communications to the terrestrial communication system, and wherein the craft is an aircraft.

19. The system of claim 18, further comprising a dummy RF load that is switched into service to absorb unwanted RF signals that enter the aircraft via the antenna.

20. The system of claim 16, further comprising a rules engine that processes a rule based on at least one of data associated with the craft or a signal associated with the craft.

21. The system of claim 16, wherein the mobile terminal is a cellular telephone.

22. An application specific integrated circuit (ASIC) that comprises the system of claim 16.

23. A method of providing mobile communications on a craft, comprising:

receiving in-band communications of voice signals from a mobile communications device of a user aboard the craft;

processing the in-band voice signals as non-translating voice signals;

enabling direct communication of the non-translating voice signals to a terrestrial communications system while the craft is in at least one of an arrival mode or departure mode;

disabling direct communication of the non-translating voice signals to the terrestrial communications system while the craft is not in at least one of the arrival mode or departure mode;

transmitting a startup notification message when the direct communication of the non-translating voice signals is being enabled; and transmitting a shutdown notification message when the direct communication of the non-translating voice signals is being disabled.

24. The method of claim 23, further comprising an act of switching on a base station when the craft reaches a predetermined location.

25. The method of claim 24, wherein the location is one of a terminal for an aircraft or a dock for a ship.

26. The method of claim 23, further comprising an act of controlling a signal level of the voice signals.

27. The method of claim 23, further comprising an act of receiving terrestrial-generated voice signals through a craft surface and reradiating the terrestrial-generated voice signals throughout an interior of the craft.

28. The method of claim 23, further comprising an act of processing non-voice signals to configure a defined operations period, which non-voice signals include at least one of a GPS signal, an air speed indicator signal, an altitude signal, or a cabin-generated signal.

29. The method of claim 23, wherein the acts of enabling direct communications and disabling direct communications are based on predetermined location data.

30. The method of claim 23, further comprising an act of turning a craft-mounted repeater at least one of on or off, the craft-mounted repeater facilitates the act communicating the non-translated voice signals.

31. The method of claim 23, further comprising an act of turning a craft-mounted base station at least one of on or off, the craft-mounted base station facilitates the act receiving the in-band voice signals from the mobile communications device.

32. The method of claim 23, further comprising an act of switching in or switching out an RF load to absorb unwanted interference signals.

33. The method of claim 23, further comprising an act of receiving and processing terrestrial voice signals on the craft for reception by the mobile communications device.

34. A system that facilitates mobile communications on an electromagnetically shielded craft, comprising:

a craft-mounted communications component that facilitates communication between a mobile terminal of a user aboard the electromagnetically shielded craft and a terrestrial cellular communications system;

a non-translating repeater associated with the craft-mounted communications component that increases a signal level associated with the terrestrial cellular communications system inside of the electromagnetically shielded craft;

a first antenna located inside the electromagnetically shielded craft that facilitates communication between the mobile terminal and the craft-mounted communications component;

a second antenna that breaches an outer surface of the electromagnetically shielded craft and facilitates communication between the craft-mounted communications component and the terrestrial cellular communications component; and a control component that monitors one or more triggers associated at least one of the electromagnetically shielded craft or usage of the craft-mounted communications component, the control component enables the non-translating repeater when the electromagnetically shielded craft is in at least one of an arrival mode or a departure mode and disables the non-translating repeater otherwise, and wherein the control component generates a startup notification message when the non-translating repeater is being enabled and generates a shutdown notification message when the non-translating repeater is being disabled.

35. The system of claim 34, the control component monitors usage of the craft-mounted communications component and inserts a user registration request in a queue when a number of available communication channels is exceeded.

36. The system of claim 34, the control system records at least one of data or signals associated with the craft-mounted communications component.

* * * * *